May 31, 1960

R. G. WEYKER ET AL 2,938,913

PROCESS FOR ANTHRAQUINONES FROM
NAPHTHALENE VIA NAPHTHOQUINONE

Filed Dec. 16, 1957

INVENTORS
ROBERT G. WEYKER
FREDERIC H. MEGSON
THEODORE HOFFMAN
GEORGE WIESNER

BY

AGENT

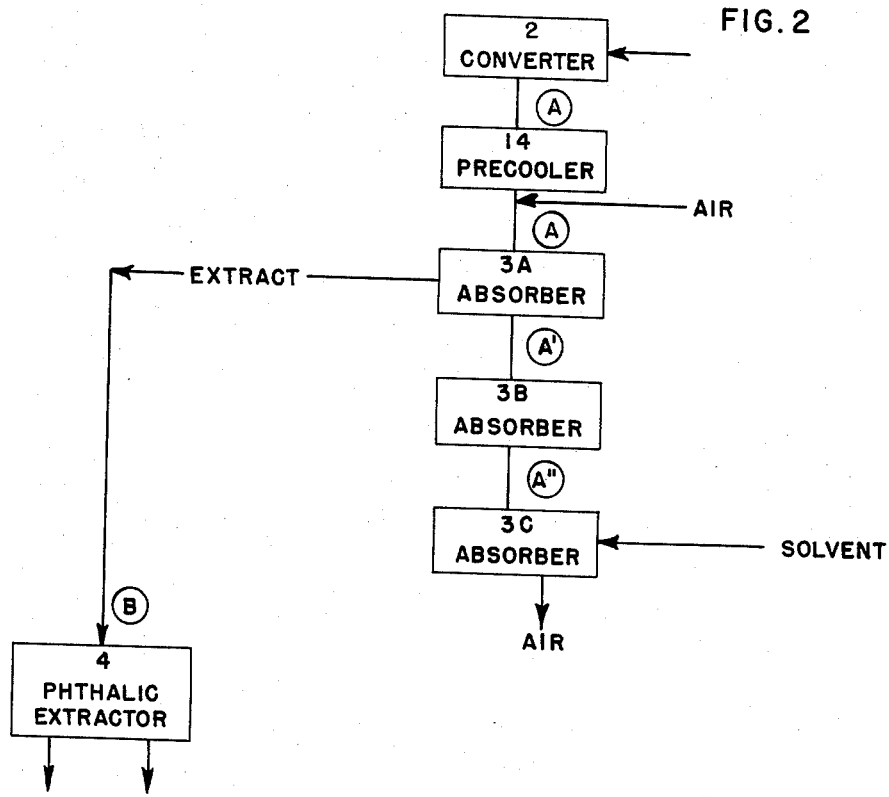

United States Patent Office 2,938,913
Patented May 31, 1960

2,938,913
PROCESS FOR ANTHRAQUINONES FROM NAPHTHALENE VIA NAPHTHOQUINONE

Robert G. Weyker, North Plainfield, Frederic H. Megson, Middlesex, Theodore P. Hoffman, Rahway, and George L. Wiesner, Bound Brook, N.J., assignors to American Cyanamid Company, New York, N.Y., a corporation of Maine Filed Dec. 16, 1957, Ser. No. 702,896

3 Claims. (Cl. 260—369)

This invention relates to a process for the manufacture of anthraquinones and more specifically, to a commercial process for large scale manufacture of anthraquinones from naphthalene which comprises oxidizing the naphthalene to a mixture comprising naphthoquinone and phthalic anhydride, absorbing the said oxidation mixture in an organic solvent, extracting therefrom the phthalic anhydride with water, reacting the resulting raffinate with a butadiene, oxidizing the resulting adduct to the anthraquinone and isolating the same.

The anthraquinones are important commercial products especially useful as intermediates in the dyestuff and pigment field. They are consumed in large quantities by the dyestuff industry, but the products up to now have been prepared by one of two general methods. One of these is the oxidation of anthracene or its derivatives. The other is the condensation of phthalic anhydride with substituted or unsubstituted benzene, followedb y ring closure of the resutling orthobenzoylbenzoic acid to the corresponding anthraquinone.

These processes have many disadvantages. First of all, anthracene is not available in sufficient quantities as to become a source for all the anthraquinone needed. Secondly, the substituted anthracenes are not readily available so that substituted anthraquinones can not be readily made by the oxidation of anthracene. This process is only good for anthraquinone itself.

The Friedel-Crafts synthesis through the orthobenzoylbenzoic acid, has the disadvantage of being a batch process. It is not readily adaptable to a continuous process even for anthraquinone itself, which is the anthraquinone made in the largest quantity. Furthermore, the preparation of substituted anthraquinones by this method results in the formation of isomers and this necessitates laborious and costly working up in order to purify the desired isomers. Furthermore, there are many substituted anthraquinones which are not readily preparable, even by these methods, but which must be made indirectly by reaction upon the unsubstituted anthraquinone after ring closure, thus adding more steps and cost to the product.

It had been known for a number of years that butadiene would react with naphthoquinone to form an adduct which was structurally a tetrahydroanthraquinone and that the said adduct was easily oxidizable to an anthraquinone. This reaction however, has remained a laboratory curiosity. At first this was due to the unavailability in large quantities of the starting materials. However, this became no longer true as much as ten years ago when butadiene became available on the market. The naphthoquinone presented less of a problem of availability since it is known that the common preparation of phthalic anhydride by the oxidation of naphthalene produces small amounts of naphthoquinone and that the use of a stabilized vanadium pentoxide catalyst under the proper conditions would produce a much larger proportion of naphthoquinone along with the phthalic anhydride. However, the naphthoquinone so prepared was not in readily usable form, since it was mixed with phthalic anhydride and often with unreacted naphthalene as well. The methods of separating the naphthoquinone from the converter products known up to now have not been economically practical.

We have found a process which permits the commercial large scale manufacture of anthraquinones by use of the Diels-Alder reaction and which is especially adapted to a continuous process. This commercial process comprises oxidizing naphthalene in such a way as to produce a large proportion of naphthoquinone, absorbing the oxidation reaction product in an organic solvent, extracting therefrom the phthalic anhydride with water in the form of phthalic acid, reacting the separated naphthoquinone in the resulting raffinate with a butadiene, extraction, oxidizing the resulting adduct to the anthraquinone and isolating the said anthraquinone.

It is an advantage of our invention that it is especially adaptable to a continuous process, which fact makes the process especially feasible on a commercial scale. It is a further advantage of our process that anthraquinone derivatives which are not readily available by the usual methods, become readily available by the choice of the proper butadiene to be used in the Diels-Alder reaction. It is a still further advantage of our invention that it permits the utilization on a commercial scale of a reaction which up to now has been a laboratory curiosity. The invention has the further advantages of starting with readily available materials and proceeding by easy commercial manipulations in a continuous manner and without costly purifications and batch steps to give excellent anthraquinones.

Our invention can be further understood with reference to the figures in which:

Fig. 2 is a schematic outline of the portion of our process in which the converter product is absorbed in the solvent, showing a preferred alternative procedure; and Fig. 3 is a schematic outline of the process steps in detaail for a special method of running the Diels-Alder reaction.

Figure 1:
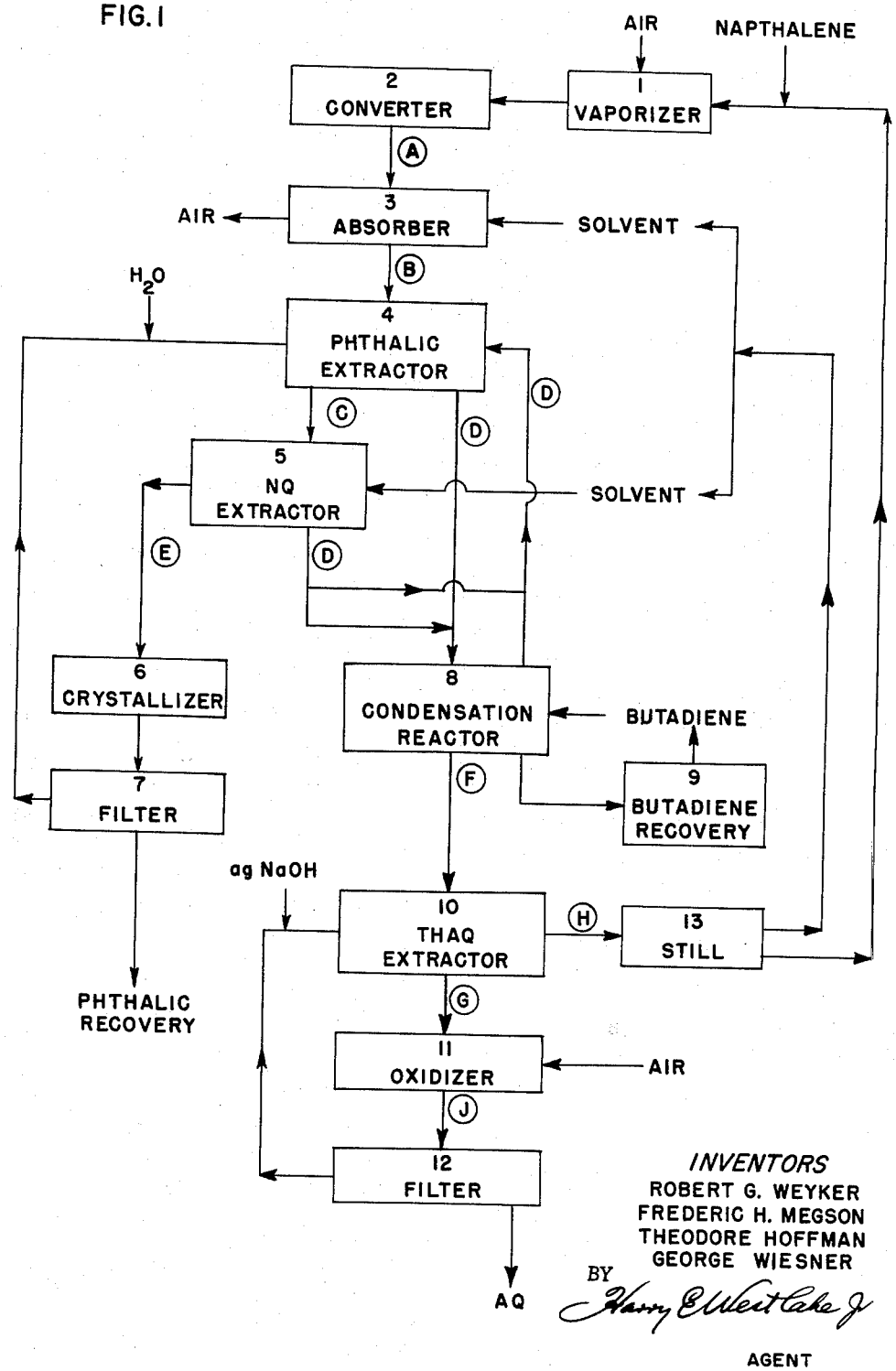
Fig. 1 is a schematic outline of the process of our invention in use for the preparation of simple anthraquinone.

The ultimate starting material of the process of our invention is naphthalene which is converted by oxidation to a mixture of naphthoquinone and phthalic anhydride. Various ways are known to carry out this oxidation, one example being the process of United States Letters Patent No. 2,765,323. Ordinarily the converter product contains unreacted naphthalene as well as naphthoquinone and phthalic anhydride, but this material does not interfere with the process of our invention and can readily be recovered and recycled into the beginning of the process. However, the converter product need not have unreacted naphthalene present, since ways are known to oxidize naphthalene to produce appreciable quantities of naphthoquinone in the phthalic anhydride without the presence of unreacted naphthalene.

By the use of various substituted butadienes, the corresponding substituted anthraquinones may be prepared. Although in the detailed description of the process, the reactions shown use butadiene itself for reaction with naphthoquinone, various other dienes may be employed. Examples of such dienes include 3-chloro-1,3-pentadiene; 3-chloro-1,3-hexadiene; 2-chloro-3-methyl-butadiene; 3-chloro-1,3-octadiene; 2,3-dimethoxy-butadine; 2,3-dimethylbutadiene; 1-phenylbutadiene; 1,4-diphenylbutadiene; 1,3,5-hexatriene, and the like. Particularly important substituted anthraquinones are those resulting from the use of 2-substituted butadienes, which are known in the literature as orthoprenes. Among the most important orthoprenes which may be used in the process of the present invention are isoprene, 2-butyl-1,3-butadiene, 2-heptyl-1,3-butadiene, 2-phenyl-1,3-butadiene, 2-acetoxy-1,3-butadiene; 2-ethoxy-1,3-butadiene, chloroprene and bromoprene. Many of the resulting 2-substituted anthraquinones which are produced by the use of these orthoprenes, are not obtainable by any other method or can not be produced at a cost which renders them practical as a commercial product.

PREPARATION OF CONVERTER PRODUCT

With reference to the figures, the preparation of the converter product can be described as follows: Molten naphthalene (usually crude, about 95% real) is fed into a vaporizer 1. The bulk of the naphthalene is vaporized and mixed with air which is also fed into the vaporizer. The mixture of naphthalene vapors and air is fed into the converter 2. This may be a fluid bed converter or a fixed bed converter. The catalyst is usually a stabilized vanadium pentoxide catalyst. One such is described in United States Patent No. 2,765,323. The naphthalene-air mixture is usually in the ratio of about 1 part of naphthalene to 20 parts of air by weight. The pressure in the converter is usually at approximately from 5 to 30 lbs. above atmospheric pressure and is operated at temperatures ranging from 400–450° C., the preferred temperature being 410–425° C. The exit gases from the converter comprise a mixture of air, naphthoquinone, phthalic anhydride and naphthalene. This is the composition A in Fig. 1.

COLLECTION AND PURIFICATION OF CONVERTER PRODUCT

The collection and purification of converter product is described in the figures in summary as follows: The converter gas A is absorbed in an organic solvent in the absorber 3. The resulting solution of naphthalene, naphthoquinone and phthalic anhydride in the solvent (composition B) then goes into a phthalic acid extracter 4 in which water is allowed to react with phthalic anhydride to form phthalic acid, which then dissolves in the water, together with a trace of naphthoquinone. This solution is composition C. The raffinate, a solvent solution of naphthoquinone and naphthalene, is composition D. Composition C goes into the naphthoquinone extracter 5 in which the dissolved naphthoquinone is reextracted with fresh solvent. This solvent extract can either be recycled to either the phthalic acid extracter 4 or the absorber 3, or it can be combined with the raffinate from the phthalic acid extracter 4 for use in the condensation reactor. When recycled to the absorber 3, higher concentrations of naphthoquinone are obtained in stream D. It is usually customary, though not necessary, to have a storage tank at this point in the process to permit more flexible control of the rate of flow of the materials through the process. The solvent solution of naphthoquinone and naphthalene (Composition D) is then fed at will into the next step.

The aqueous raffinate from the naphthoquinone extractor 5 is a water solution of phthalic acid (Composition E) which is run to a crystallizer 6. The phthalic acid is then crystallized out and the slurry is filtered in the filter 7. The phthalic acid is then recovered usually in the form of phthalic anhydride. The filtrate, a saturated water solution of phthalic acid can be recycled into the phthalic extractor 4.

A solvent which can be used in the collection and purification of the converter product must have certain properties. It must be inert to naphthoquinone, phthalic anyhydride and naphthalene, but be a good solvent for all of these materials. It must be stable to distillation with a relatively high boiling point. The minimum boiling point is approximately 230° C., since materials boiling below this temperature can not be operated at the temperatures in which the absorber operates without serious vapor loss. Usually solvents boiling over 250° C. are used because of this loss, but solvents with which the loss is not an economic problem may have the lower boiling point. The boiling point however, should not be so high as to preclude easy removal or purification by distillation. The solvent furthermore, must be insoluble in water and must have a density different from that of water, either greater or less than 1.0 so that separation of the aqueous and solvent phases can be carried out in the various extractions. As long as there is a density difference between the solvent and water, a separation can be achieved. The solvent furthermore should have a sufficiently low freezing point so that solidification does not occur at the temperatures being used. For that reason, the solvent is specified in the claims as a liquid solvent, although the term liquid is to be understood to mean liquid at the temperatures at which the operations are being carried out. A maximum freezing point for practical operation is 60° C. Examples of solvents which meet these requirements and which may be used comprise high boiling hydrocarbons such as polynuclear aromatic hydrocarbons (for example 1,1-ditolylethane and o-terphenyl); aliphatic hydrocarbons such as mineral oil with a sufficiently low boiling point (e.g., straw oil); substituted hydrocarbons such as the chlorinated naphthalenes, esters such as dioctyl- and dibutyl-phthalate, high boiling ethers such as diphenyl ether, and the like. A preferred solvent is alpha-monochlorinated naphthalene, which is sold under the trademark Halowax 1031.

The temperatures of the converter gas as it emerges from the converter 2 is a very high one since the converter is run at a temperature range of 400–450° C. One of the functions of the solvent is that of cooling the converter products, a step which is necessary in order to prevent decomposition of naphthoquinone. Much of the cooling must be done before the converter gas is absorbed in the solvent. The temperature must be reduced as low as possible but must be kept above the dew point of the mixture to prevent substantial deposition of any product in the gas line. The dew point is in the range of 170–180° C. Without this precooling before entry of the converter gas into the absorber, sufficient decomposition of the naphthoquinone takes place to affect seriously the anthraquinone conversion yield of the process. This can be seen by the following results:

| Temp. of Converter Gases entering Absorber, ° C. | Average Percent Yield of Anthraquinone |
| --- | --- |
| 200 or more | 75.0 |
| 188–192 | 85.0 |
| 170–175 | 92.5 |

Furthermore, thermal decomposition of naphthoquinone occurs in solution. The naphthoquinone content of a 14.7% naphthoquinone solution in alpha-monochloro-naphthalene dropped to 13.5% on holding at 200° C., for 5 hours, but no loss of naphthoquinone was sustained when a similar solution was held at 150° C. for 20 hours.

A serious problem was therefore faced in absorbing the converter gases in a solvent at a low enough temperature to avoid decomposition while avoiding cooling below the dew point so that the gas stream would not get plugged by condensation in the line. The complication comes from the fact that the preferred temperature of absorption is actually well below the dew point. The gas stream can be partially cooled by admixture with cooler air after the gas stream has passed through a precooler 14 as shown in Fig. 2. The air can be added ahead of the precooler 14, but more efficient operation is obtained by adding it after the precooler. This can dilute the gas and reduce the dew point somewhat. The air, as introduced, must be hot enough to prevent the product from being precipitated in the gas line.

The absorption system can use any type of gas liquid contactor. In practice, the absorption system consists of three fume scrubber type absorbers used in series. The fume scrubber type is preferred because all surfaces where product deposits are irrigated. This preferred method of operation is illustrated in detail in Fig. 2. The cooled converter gas A comprising air, naphthoquinone, phthalic anhydride and naphthalene, enters the first absorber 3A at a temperature below 190° C. The liquor in this absorber is held at about 90° C. The Halowax solvent is fed continuously in a countercurrent flow into the absorber system and the extract B is withdrawn continuously from absorber 3A. When the concentration of naphthoquinone reaches 18–20%, the product stream of liquor is continuously withdrawn from absorber 3A.

The second absorber 3B is held at 60° C.,±10°. The gases from absorber 3A (Composition A') enters 3B and are met with the solvent flowing countercurrent from absorber 3C. The naphthoquinone concentration in the exit stream from this absorber runs 4 to 6%. The exit stream is continuously withdrawn from this absorber and is used in absorber 3A. The liquor leaving the third absorber 3C and entering absorber 3B contains about 1% or less naphthoquinone. The temperature in this third absorber 3C is held at 30–35° C. to minimize the Halowax content of the effluent air stream. The temperature is held above 30° C. in order to prevent condensation of water vapor in the air, since liquid water at this point is undesirable because it would cause the formation of insoluble phthalic acid, undesirable at this point since it may foul the equipment. The temperature of the solvent in absorber 3C is limited by the freezing point of the solvent and the solubility of naphthalene in the solvent. If a relatively high melting absorbent is used, such as o-terphenyl with a setting point of 55° C., the temperatures in the three scrubbers must be adjusted to allow for the physical properties of the solvent. If the solubility of naphthalene is allowed to fall too low by using too low a temperature, precipitated naphthalene may foul the equipment.

After leaving the absorber, the chloronaphthalene solution (Composition B) is then passed through an extractor 4, where the phthalic anhydride is hydrolyzed to phthalic acid with water, the phthalic acid going into the water phase as it is formed. The extractor 4 may be a column, an agitated kettle, or other apparatus. Many types of extractors may be used here, but it is preferred to use a countercurrent extraction in a mixer settler. The product stream liquor from the absorbers (Composition B), with a specific gravity of about 1.2, passes through the extractor 4 countercurrently to a stream of water. It is preferred to introduce a stream of recycled phthalic acid filtrate (that is, a saturated solution of phthalic acid) to the extractor 4. Fresh water equivalent in amount of about 1/10 of the phthalic acid filtrate is also fed to the extractor. All fresh water can be used instead of the phthalic acid filtrate. The extractor operates at 93–97° C. or as near as practicable to the boiling point of water to permit a fast rate of hydrolysis of the anhydride and to permit a high concentration of phthalic acid in water, since high temperatures increase the rate of hydrolysis of the anhydride and permits more concentrated solutions of phthalic acid. The extraction must be carried out above 70° C. in order to achieve hydrolysis at a practical rate. This hydrolysis and water extraction removes all but a trace of the phthalic acid from the solvent liquor. The rate of addition of recycled phthalic acid solution and water to the extractor is such as to provide a concentration of phthalic acid in the extract consistent with economical operation (that is, about 10%).

The 10% phthalic acid solution taken off the top of the extractor contains a small amount (0.8–1%) of dissolved naphthoquinone. To remove this material, the aqueous phthalic acid solution may be sent through a second extractor countercurrent to a feed of solvent. This reextraction occurs in the NQ extractor 5 in Fig. 1. This step is not absolutely necessary, but is highly to be preferred, since for the most economical operation it is advisable to wring out from the process every last possible percentage of naphthoquinone yield. The naphthoquinone extract from NQ extractor 5 is preferably recycled to absorber 3 as part of the solvent feed, since higher concentrations of naphthoquinone in stream D are obtainable by this method. Alternatively, it can be recycled into the phthalic extractor 4 or combined with stream D.

The aqueous phthalic acid extract (Composition E) from the extractor 5 (at a temperature of about 95° C.) is fed into a crystallizer 6 where the solution is cooled to about 25° C., causing the phthalic acid to precipitate. The phthalic acid is then removed on a filter 7 and the filtrate, still containing about 1% of phthalic acid, can be recycled to the phthalic acid extractor as is usually preferred. Normally the phthalic acid filter cake is then dehydrated to phthalic anhydride and recovered in that form.

It is an advantage of this particular phase of our invention that by recycling the phthalic acid filtrate, a more efficient recovery of phthalic acid is then obtained.

Naphthoquinone itself may be isolated from the solvent solution of naphthalene and naphthoquinone after removal of the phthalic anhydride. This is achieved by crystallization from the liquor upon cooling and adding cold hydrocarbon solvent, such as heptanes or octanes. The resultant crystalline mass is filtered and the crude naphthoquinone can be purified by recrystallization from liquid hydrocarbons. Better than 90% of the naphthoquinone can be recovered in this manner. Any liquid hydrocarbon paraffin such as the hexanes, heptanes, octanes, nonanes or mixtures thereof in the form of petroleum naphtha can be used as the diluent. The mixture must be cooled below 0° C., and preferably lower, to get good recovery of the naphthoquinone.

CONDENSATION WITH A DIENE AND OXIDATION OF THE ADDUCT

The solution D of naphthoquinone and naphthalene in solvent, which comes out of the phthalic extractor 4 as the raffinate and in the naphthoquinone extractor 5 as the extract, is usually stored in a separate tank from which it is withdrawn as needed for reaction with the butadiene. The Diels-Alder reaction between the butadiene and the solvent solution of naphthoquinone can be carried out in any suitable kind of reactor. We have found highly preferable, a pipeline reactor. The chloronaphthalene solution, containing about 31% naphthoquinone and unconverted naphthalene, is fed continuously to the codensation unit to which butadiene is also fed continuously. The preferred reactor consists essentially of a long length of pipe operating under about 100 p.s.i. at about 140° C. Other temperatures can be used in combination with sufficient pressure to maintain a completely liquid system, as e.g., about 60 p.s.i.g. with 100° C. The minimum temperature for efficient reaction is 80° C. Above about 150° C., decomposition of naphthoquinone is a problem. The pipeline reactor has a plurality of vertical sections. The solvent solution and butadiene are introduced at the top of the first section, at which point the specific gravity of the solution is at a minimum. As the Diels-Alder reaction proceeds, the density of the liquor increases. The low density of the feed solution inhibits short circuiting, since this material being lighter, resists being moved down the reactor section. At the end of each section, the mixture is then run to the top of the next section. Thus, this particular mode of carrying out this reaction permits a more uniform exposure of the reactants to one another.

Since the reaction of naphthoquinone with butadiene involves an equilibrium, an excess of butadiene is required for complete consumption of the naphthoquinone.

A variety of condensation reactor systems and proportions may be used. If the reactor is operated in such a way that the naphthoquinone and the feed liquor is completely condensed by using a butadiene excess as low as 2–5%, this slight excess can be discharged and burned without difficulty along with the small percentage of butanes and butenes, usually found in commercial butadiene. If the reactor 8 is operated in such a way that a large excess of butadiene is employed, recovery of the butadiene must be provided, as shown in Fig. 1 by the step 9. This is usually done by stripping off the excess, followed by condensation and returning it to storage.

An improved two-stage system of condensation is shown in Fig. 3. In this method, the naphthoquinone in the Halowax solution is reacted with a deliberate deficiency of butadiene in the first section 8A of the reactor, in which case all of the butadiene is used leaving unreacted naphthoquinone. The "wild gas," (butanes and butenes) is stripped from the system and burned. The incompletely reacted naphthoquinone liquor is then passed to the second section of the reactor 8B in which the condensation is completed through the use of an excess of butadiene. The excess butadiene is stripped from the liquor and may either be recovered or preferably is used as the deficient charge to the first section of the condensation reactor 8A. The improved two-stage condensation process has the definite and practical advantage in that it eliminates the need for a butadiene recovery system 9.

It is well known that 1,4,4a,9a-tetrahydroanthraquinones can be readily oxidized into anthraquinones. Many agents, including very mild oxidizing agents are readily effective. These include such things as nitro compounds, inorganic oxidizing agents, such as hydrogen peroxide, chromic acid, ferricyanides, air and the like. Especially to be preferred from the standpoint of cost and availability of course, is air, and this is the oxidizing agent usually used. The tetrahydroanthraquinone can be oxidized with air either in the solvent solution or after extraction of the tetrahydroanthraquinone from the solvent by other means, such as caustic solution or in a binary phase mixture of the solvent solution with aqueous caustic. However, greatly to be preferred is the process shown in Figure 1, in which the solvent solution of tetrahydroanthraquinone an naphthalene (Composition F), is extracted with aqueous caustic of about 1% concentration in the THAQ extractor 10.

Such an extraction is best done in a countercurrent manner. The disodium salt of tetrahydroanthraquinone dissolves in the water, and an extract containing about 1% of tetrahydroanthraquinone is passed into a continuous oxidizer, usually a multi-stage apparatus through which the air is blown to give the anthraquinone. The extraction column is run at 90°–95° C. and the oxidizer operates at about 140°–150° C. and 70 p.s.i.g. The oxidizer can be run at any temperature from ambient temperatures up, but higher temperatures favor the more complete oxidation to anthraquinone. The resulting anthraquinone slurry is filtered and the crude anthraquinone slurry is filtered and the crude anthraquinone is washed and then purified, usually by sublimation. The alkaline filtrate may be recycled in a preferred modification of this process. The residual solvent solution from the tetrahydroanthraquinone extractor 10 (designated as Composition H) is run into a recovery still, in which it is separated into its constituent components. The solvent is recirculated to the absorber 3 and to the naphthoquinone extractor 5, usually through a storage tank. A small amount of undistillable residue is discarded. The naphthalene component can be recycled as feed to the converter 2.

As has been pointed out, the oxidation of the tetrahydroanthraquinone can be carried out either in the chloronaphthalene solution or after extraction with an aqueous alkali. The extraction before oxidation is not just a matter of manipulative convenience, but gives a definite improvement by acting as a purification step. This is shown in the following data:

| Process Procedure | Melting Point of Sublimed Anthraquinone (First Drop and Final Melting), ° C. |
|---|---|
| A. THAQ Oxidation in Chloronaphthalene | 282.2–284.6 |
| B. Oxidation in Chloronaphthalene in presence of Dilute NaOH | 282.5–284.5 |
| C. Extraction of THAQ with NaOH Followed by Oxidation | 283.7–285.7 |

Although the invention has been described in detail in reference to the preparation of anthraquinone itself using naphthalene as the starting material, and the treatment of the intermediate naphthoquinone with butadiene, it is not to be limited to the use of butadiene. As indicated above, various substituted butadienes may be used in addition to butadiene itself, and the use of the term "a butadiene" is meant to refer to other applicable substituted unsaturated compounds of the 1,3-diene type which enter into a Diels-Alder type of reaction with naphthoquinone. Thus, homologs of butadiene give substituted anthraquinones, isoprene for example giving methylanthraquinone and chloroprene giving chloroanthraquinone.

Our invention can be illustrated by the following examples. Parts are by weight unless otherwise indicated.

*Example 1*

Molten, semi-refined naphthalene (78°, 95%) is pumped at a rate of 13.1 g. per minute into a vaporizer, together with air at a rate of 180 liters per minute. The resultant vapor, containing 1.2 mole percent naphthalene, is preheated to 425° C., after which it is passed through six tubes of 0.611" ID, each containing 320 cc. of 8–10 mesh $V_2O_5$ catalyst. The catalyst bed height is 60". Twenty inches of 4-mesh Carborundum chips are above the catalyst. The 80 inch tubes are contained in an agitated salt bath automatically maintained at 425° C.

The converter product gases have the following composition by spectrophotometric analysis:

| | NQ | PAN | Naph. |
|---|---|---|---|
| Mole percent | 0.348 | 0.520 | 0.365 |
| Lbs./100 lbs. naph. fed | 34.9 | 48.8 | 29.6 |

The converter gases are fed to an absorption system via a line jacketed with 180° water under pressure. The converter gases are thereby cooled to ca. 190° C. prior to entering the absorber. The absorption system consists of three fume scrubbers arranged in series. At the start of the run, the solvent (monochlorinated naphthalene) is charged to each fume scrubber. The solvent is recycled through spray nozzles and the organic constituents of the converter gases are absorbed in the solvent as the gases are washed. Air, preheated to 150° C., is fed at the rate of 180 liters/min. into the primary absorber in such a way as to mix with the converter gases before they are washed by the solvent. In this way the gases are cooled from 190° C. to about 170° C., and the decomposition effects of the hot gases on the NQ in the solvent are minimized.

The converter and absorption system is run for 4 hours, at the end of which time the NQ concentration of the liquor in the primary absorber is 16%; the liquor in the second absorber is 4% NQ and the liquor in the 3rd absorber contains 0.6% NQ. Chloronaphthalene is now fed to the third absorber at a rate of 600 g./hr., and flows countercurrent to the gas stream (that is, from absorber 3C to 3B to 3A in Fig. 2). The liquor in absorber 3A is drawn off at such a rate as to maintain the liquor level constant.

This liquor is pumped to the top of a 1½" ID, 14' column packed with ¼" stainless steel Raschig rings. Water preheated to 90° C. is pumped into the bottom of the column at a rate of 100 cc. per min. The column is maintained at 92–95° C. The 6.5% phthalic acid solution taken off the top of the extraction column is passed, via a steam-jacketted line, into the bottom of a six-foot Scheible column. Chloronaphthalene, at the rate of 240 g. per hour, is fed to the top of the Scheible column. The chloronaphthalene removes dissolved naphthoquinone from the phthalic acid solution as it flows through the column. The phthalic acid solution taken off the top of the Schieble column is cooled to 25° C. and filtered. The filtrate contains 0.8% phthalic acid. The chloronaphthalene solution of NQ collecting at the bottom of the Scheible column is pumped to the top of the 14' column at a rate consistent with its rate of accumulation (approx. 250 g./hr.).

The chloronaphthalene-NQ liquor collecting in the bottom of the packed column is pumped to a surge container at a rate designed to maintain a constant level of oil in the bottom of the column.

After 24 hours of operation, the absorber liquor being drawn from 3A contains 19.4% NQ.

The converter, absorber, and extraction columns, are operated for six days, at the end of which time approximately 400 lbs. of liquor is on hand. The liquor contains about 20% naphthoquinone, 1% phthalic acid, 19% naphthalene, and 60% chloronaphthalene. This liquor, maintained at 60° C. to prevent naphthoquinone crystallization, is pumped at a rate of 64 cc./min. into a vertical, continuous condensation unit filled with chloronaphthalene. Butadiene at a rate of 5.8 g./min., is pumped into the naphthoquinone solution header prior to its entering the reactor. The reactor is operated at 100° C. and 70 p.s.i.g. Retention time is five hours. After five hours of operation the chloronaphthalene has been displaced from the reactor and the product liquor contains 24.2% tetrahydroanthraquinone and 2% naphthoquinone. The product liquor is passed through a length of pipe containing a steam sparger. Live steam is blown through the liquor and removes the dissolved butadiene. This gas may be burned or recovered, depending on the economics involved.

The steam-stripped liquor is collected over a 51 hr. period, after which it is fed, at the rate of 156 g./min., into a Oldshue type extraction column. A 1.0% solution of NaOH is fed countercurrent to the chloronaphthalene-THAQ liquor, at a rate of 2420 cc./min. The column is operated at 90–95° C. The THAQ is extracted from the chloronaphthalene liquor presumably as the disodium salt, after which this solution is passed through a Homomix unit. Air, fed to the Homomix, oxidizes the THAQ and a slurry of crude AQ is obtained. The AQ is recovered by filtration. The filtrate is recycled to the column for reuse.

The chloronaphthalene-naphthalene liquor collected at the bottom of the column is subjected to fractional distillation. The chloronapthalene and naphthalene thus recovered are recycled through the process.

The crude AQ is sublimed, giving a yield of 83.4% based on the NQ in the chloronaphthalene liquor from the extraction column.

The crude phthalic acid is dehydrated at 200° C., after which it is held at 285° C. for 8 hours, in contact with 0.025% NaOH to remove traces of NQ. The material is then distilled in a five-plate column. The refined PAN has a set point of 130.8° C., and an APHA color of 50.

*Example 2*

The procedure of Example 1 is followed except that the phthalic acid filtrate from the phthalic acid recovery is recycled into the phthalic acid extractor. This filtrate contains 0.93% phthalic acid and is fed to the extractor at a rate of 115 cc./min.

*Example 3*

The procedure of Example 1 is followed using ditolyl ethane in place of chlorinated naphthalene. The ditolyl ethane solution obtained from the absorber contains 13.6% naphthoquinone. After the phthalic acid extraction, the residual oil contains 13.5% naphthoquinone and 0.005% phthalic acid. This is reacted with butadiene in the procedure of Example 1 and the tetrahydroanthraquinone thus formed is similarly extracted with 1% sodium hydroxide and the extracted tetrahydroanthraquinone is oxidized with air in the procedure of Example 1. A good yield of anthraquinone is obtained.

*Example 4*

The procedure of Example 1 is followed except that isoprene (2-methyl-1,3-butadiene) is used instead of butadiene. The product, 2-methylanthraquinone is isolated in the same way in a yield of about 92% of theory, based on naphthoquinone used.

*Example 5*

The procedure of Example 1 is followed using chloroprene (2-chloro-1,3-butadiene) in place of the butadiene, to give 2-chloroanthraquinone in about 86% yield, based on the naphthoquinone.

*Example 6*

The procedure of Example 1 is followed through the phthalic extraction and NQ reextraction except that the solvent extract from the NQ extractor 5 is recycled to the absorber 3. The chloronaphthalene solution of naphthoquinone coming from the phthalic extractor 4 contains about 31% naphthoquinone, 4–6% naphthalene, and less than 0.2% phthalic anhydride. This solution is then cooled to 40° C. as it leaves the extractor 4. It is then diluted with about four times its volume of octane-chloronaphthalene mixture, and cooled to −20° C. The octane chloronaphthalene mixture is conveniently the recrystallization filtrate from previous batches plus such makeup of octane as is needed. This cooling is carried out continuously and the cooled slurry is continuously filtered through a pressure filter. The crude naphthoquinone is dissolved from the filter with mixed octanes at 90–95° C., and the solution is cooled to −20° C. and filtered. The product after drying analyzes better than 98% naphthoquinone.

We claim:

1. A process for the continuous manufacture of anthraquinones from naphthalene by the oxidation of said naphthalene to naphthoquinone followed by condensation of said naphthoquinone with butadiene selected from the group consisting of butadiene, chloroprene, and isoprene which comprises passing a mixture of naphthalene vapor and air over an oxidation catalyst at elevated temperatures to produce an oxidation mixture of air, naphthoquinone, phthalic anhydride and unreacted naphthalene; collecting the said oxidation mixture by absorbing it in an inert liquid water-immiscible solvent therefor, said solvent having a boiling point above 230° C. and a density materially different from that of water, said solvent being selected from the group consisting of 1,1-ditolylethane, orthoterphenyl, mineral oil, chlorinated naphthalenes, dialkylphthalates, and diphenylether said collection being carried out at temperatures between ambient temperatures and 200° C. to form a solution of naphthoquinone, phthalic anhydride and naphthalene; extracting said solution of the oxidation mixture by forming a liquid-liquid contact with water to hydrolyze phthalic anhydride to phthalic acid resulting in a solution of phthalic acid in the water, separating the phases, extracting small amounts of naphthoquinone from said phthalic acid aqueous solution phase by forming a liquid-liquid contact with fresh quantities of solvent and separating the phases, the latter solvent extract being recycled tot he said colelction of converter gases in solvent, recovering from the phthalic acid solution the phthalic acid and recycling the said phthalic acid filtrate into the aqueous extraction of the said solvent solution of the oxidation mixture; passing into said solvent raffinate a butadiene while keeping said raffinate at a temperature of at least 80° C., the reaction mixture being maintained at a pressure above the vapor pressure of said butadiene at the temperature used, to form a condensation reaction mixture containing a tetrahydroanthraquinone; contacting said condensation reaction mixture with an aqueous caustic solution to form an aqueous solution of a salt of a tetrahydroanthraquinone, separating said solution from the residual solvent mixture, passing air through said tetrahydroanthraquinone salt solution while keeping said solution at 140–150° C., and separating the resulting anthraquinone, the residual solvent mixture being separated into its component parts by distillation and the recovered naphthalene and solvent being recycled, the naphthalene into the catalytic oxidation step and the solvent into the solvent absorption and extraction steps.

2. The process of claim 1 in which the said oxidation mixture of gases is cooled below 200° before contacting the said solvent in the absorption step by admixture with air heated above 150° C., and in which the said absorption step is carried out in a three-stage absorber in which the said solvent is circulated countercurrent to the said gases and in which the stages are held progressively lower in temperature as the gases proceed.

3. A process for continuous manufacture of naphthoquinone from naphthalene which comprises passing a mixture of naphthalene vapor and air over an oxidation catalyst and elevated temperatures to produce an oxidation mixture of air, naphthoquinone, phthalic anhydride and unreacted naphthalene; collecting the said oxidation mixture by absorbing it in an inert liquid water-immiscible solvent therefore, said solvent having a boiling point above 230° C. and a density materially different from that of water, said solvent being selected from the group consisting of 1,1-ditolylethane, orthoterphenyl, mineral oil, chlorinated naphthalenes, dialkyl phthalates and diphenylether, said collection being carried out at a temperature between ambient temperatures and 200° C., to form a solution of naphthoquinone, phthalic anhydride and naphthalene; extracting said solution of the oxidation mixture by forming a liquid-liquid contact with water to hydrolize phthalic anhydride to phthalic acid resulting in a solution of phthalic acid in the water, separating the phases, extracting small amounts of naphthoquinone from said phthalic acid aqueous solution phase by forming a liquid-liquid contact with fresh quantities of solvents and separating the phases, the latter solvent extract being recycled to the said collection of converted gases in solvent, recovering from the phthalic acid solution the phthalic acid and recycling the said phthalic acid filtrate into the aqueous extraction of the said solvent solution of the oxidation mixture; and isolating the naphthoquinone from said solvent solution by adding a liquid paraffin hydrocarbon selected from the group consisting of hexanes, heptanes, octanes and nonanes, cooling the mixture below 0° C. and removing the separated naphthoquinone, the residual solvent mixture being separated into its component parts by distillation and the recovered naphthalene and solvent being recycled; the naphthalene into the catalytic oxidation step and the solvent into the solvent absorption and extraction step.

References Cited in the file of this patent

UNITED STATES PATENTS

| | | |
|---|---|---|
| 1,890,040 | Luttringhaus et al. | Dec. 6, 1932 |
| 2,402,226 | Hyman et al. | June 18, 1946 |
| 2,652,408 | Lecher et al. | Sept. 15, 1953 |
| 2,783,251 | Sayward | Feb. 26, 1957 |